(12) United States Patent
Shores (10) Patent No.: US 8,136,719 B2
(45) Date of Patent: Mar. 20, 2012

(54) FISH MEASUREMENT CULLING DEVICE

(75) Inventor: Brent A. Shores, Boise, ID (US)

(73) Assignee: Lucky2Creations, LLC, Boise, ID (US)

( * ) Notice: Subject to any disclaimer, the term of this patent is extended or adjusted under 35 U.S.C. 154(b) by 680 days.

(21) Appl. No.: 12/275,999

(22) Filed: Nov. 21, 2008

(65) Prior Publication Data

US 2010/0127086 A1 May 27, 2010

(51) Int. Cl.
*G06P 11/00* (2006.01)
(52) U.S. Cl. .......................................... 235/61 R; 235/90
(58) Field of Classification Search .................. 235/61 R, 235/90
See application file for complete search history.

(56) References Cited

U.S. PATENT DOCUMENTS

| | | |
|---|---|---|
| 4,643,267 A | 2/1987 | Southern et al. |
| 4,660,666 A | 4/1987 | Reder et al. |
| 4,721,174 A | 1/1988 | Letzo |
| 4,753,031 A | 6/1988 | Owen |
| 5,031,710 A | 7/1991 | Parker et al. |
| 5,388,547 A | 2/1995 | Lehr et al. |
| 5,545,855 A | 8/1996 | Stanfield et al. |
| 5,637,838 A | 6/1997 | Arey et al. |
| 5,941,016 A | 8/1999 | Welcher |
| 5,979,752 A * | 11/1999 | Holloway ........................ 235/90 |
| D458,858 S | 6/2002 | Thadani |
| 6,608,261 B2 | 8/2003 | Thadani |
| 6,696,650 B2 | 2/2004 | Muller et al. |
| 6,809,658 B1 | 10/2004 | Lofaso |
| 6,862,834 B2 | 3/2005 | Basch |
| D532,860 S | 11/2006 | Richardson et al. |

OTHER PUBLICATIONS http://www.basspro.com/homepage.html, Mar. 3, 2009.

* cited by examiner

*Primary Examiner* — Karl D. Frech
(74) *Attorney, Agent, or Firm* — Scott D. Swanson; Dykas & Shaver, LLP (57) ABSTRACT

The present invention is intended to provide the fisherman with a current score on a predetermined number of largest fish caught by culling the smaller fish and keeping the larger fish. The invention provides a device body that floats in water as well as a series of fish measurement recording devices that are not affected by inclement weather.

10 Claims, 8 Drawing Sheets

FISH MEASUREMENT CULLING DEVICE

FIELD OF THE INVENTION

The invention generally relates to an accurate device for recording and maintaining the weight of fish caught during a fishing competition where the goal is to catch and retain a predetermined number of fish of the greatest weight within a prescribed time limit, subsequently culling the smallest fish when a larger one is caught.

BACKGROUND OF THE INVENTION

The sport of competitive fishing has experienced a large amount of growth in recent years. An increased number of people are competing in fishing tournaments and an increased number of fans are watching the tournaments. Subsequently, corporations and other sponsors are investing more into the fishing tournaments. As the tournaments continue to grow, the prize money from the tournaments grows as well. The goal of the tournaments is to catch a predetermined maximum number of fish of the largest size. The fisherman can catch as many fish as the fisherman wants but can only keep the predetermined maximum number of fish in the boat at a time. As the fisherman continues to fish, the fisherman catches more fish which are then compared to the previously caught fish. Subsequently, the smallest fish are released and the largest fish are kept. At the conclusion of the tournament, the fisherman typically transports his catch to a tournament scale where the fish are officially measured. Generally, the tournament limit on scored fish is seven. However, in some fishing tournaments the limit can be more than seven or less than seven, with five being a relatively common number.

When a fish is caught by the fisherman, the fisherman measures the fish on a scale or with a measuring tape and places a tag on the fish to code the fish for future reference. The fisherman then places the fish in a live well or other similar container. The fisherman also records the information of the tag number and the size of the fish onto a recording device. When the fisherman fills all of his tags, the fisherman can subsequently catch more fish, quickly reference the size and weight of the fish, and retrieve the fish from the live well. If the fisherman has caught a larger fish than one of the fish in the live well, the fisherman can release the smaller fish from the well and tag the new fish.

The problems encountered by prior fish measurement recording inventions stem from the atmosphere of the fishing tournament. Fishing tournaments are routinely conducted in bad weather and on rocking boats. These conditions lead to difficulty recording fish measurements. A typical system involves erasable marker and a tabulation board on which the fisherman writes. One problem is that erasable marker washes off when it gets wet. Furthermore, another popular system comprises a peg and board system but the problem with this system is that the pegs fall out of the board if the board is not kept flat on a flat surface. Additionally, these systems can fall into the water and sink or be damaged by the water.

Accordingly, several inventions have attempted to resolve the difficulties of the prior art. Difficulties of the previous inventions include, but are not limited to, inventions that are not able to retain a measurement in inclement fishing conditions or inventions that are not easily used in a boat. For example, U.S. Pat. No. 5,979,752 to Holloway is directed to a tabulation pegboard for use during a fishing competition. The invention uses a pegboard with pins or pegs that are inserted into holes that are placed in the pegboard. The holes in the pegboard are labeled with numbers in order to associate a fish in a live well with a series of rows of holes to gather measurements for more than one fish. The problem with these boards is that when the fisherman moves the board or picks up the board and places it in a vertical position the pin or peg may have a tendency to fall out and consequently lose the fish measurement recording. Additionally, at times of inclement weather, the holes become wet, thus likely decreasing the friction between the pin and the hole, making it easier for the pin to fall out. Furthermore, with all of the pins, it is easy to lose a pin or to drop the pins in the bottom of the boat which decreases the amount of time fishing as the fisherman must pick up all of the pins. The same difficulties arise with U.S. Pat. No. 5,388,547 to Lehr, et. al., another peg and board weight recording invention. Still another known weight tabulation board on the market uses erasable marker in a whiteboard style cordoned into multiple weight tabulation areas for multiple fish. The problem associated with this weight tabulation board is that in inclement weather, if the board gets wet the measurements can wash off.

Accordingly, an object of the present invention is to provide a weight tabulation board that resists inclement weather or inclement water conditions.

Another object of the invention is to present a quick and efficient system to aide the competitive fisherman and to maximize his time in fishing and retaining the best catches of the competition.

Another object of the current invention is to maintain the fish measurements for longer periods of time while dealing with inclement weather or inclement water conditions which often leads to increased difficulty in retaining tabulations.

A further object of the invention is to maintain a list of measurements that is difficult to erase or change without the application of sufficient force.

A further object of the invention is to provide a weight tabulation board that floats in the event that the board is dropped into the water.

Another object of the invention is to provide a weight tabulation board that retains measurements when the board is transported.

Another object of the invention is to provide a board to record measurements on with the measurements being easily culled with new measurements.

Another object of the invention is to provide a board to record fish measurements on that floats in water.

SUMMARY OF THE INVENTION

The present invention is directed to a new device for tabulating and maintaining an up-to-the-minute record of the weights of a predetermined number of fish caught within a prescribed time during a fishing competition. The object of the fishing tournaments is to catch and retain the fish of the greatest weight while culling the lightest fish when the catch exceeds the predetermined number. Typically a fishing tournament involves identifying each fish caught by a particular code, either numerically, by color, or by some other indicia, then temporarily maintaining the fish in a live well and identifying them by a floater bearing the number or color code attached to each fish. Furthermore, the invention includes weighing and recording the weight on the invention containing indicia having the number, color, or any other indicia associated with the indicator.

The device body itself consists of a planar member with the measurement recording devices therein. The device body can be configured to float in water or not configured to float in water. In a preferred embodiment the floatable device body has two chambers, a chamber housing the measurement recording devices and a chamber providing floatation to the device body. The device body, and in some embodiments the measurement chamber, includes typically from five to seven, although there can be more or less than five or seven, rows comprised of fish measurement recording modules.

The fish measurement recording modules can be either electric, typically digital, or mechanical. Mechanical fish measurement recording modules as disclosed are excellent at resisting inclement weather, resisting inclement boat conditions, and the numbers do not wash off if accidentally dropped in a body of water or a live well. Typically the measurement recording modules record measurements that consist of three digits, although more or fewer digits can be used depending on the embodiment of the invention.

The mechanical measurement recording modules can be made from a wide variety of measurement recording modules. In a preferred embodiment of the current invention the measurement recording modules typically comprise three, although there can be fewer than three or more than three, ratchet and wheel modules comprising a wheel piece and a ratchet piece with the wheel piece having numbers and the ratchet piece attached to the wheel piece.

Also in a preferred embodiment, each of the five to seven rows of fish measurement recording modules is numbered one through five, six, or seven. Although this is the preferred embodiment, any indicia corresponding to a tag to place on a fish can be used including symbols, colors, numbers, etc.

The ratchet and wheel modules rotate in order to display different numbers on each wheel piece. In order to maintain the ratchet and wheel modules in a set position to display a specified number, a pawl has been positioned on the back of the device body in order to hold the ratchet and wheel module in place. As a result of the interaction between the ratchet and wheel module and the pawl, a user must exert a force on to the ratchet and wheel piece to force it to move past the pawl.

In another embodiment, the pawl is positioned such that when engaged in detent with the ratchet and wheel module, the pawl is beneath the surface of the back of the device body. When the ratchet and wheel module is rotated, the pawl is pushed out of detent and beyond the surface of the device body. This function prevents the ratchet and wheel module from rotating when the back of the device body is positioned on a flat surface.

In a fishing tournament, each new fish caught is quickly identified, weighed, and tagged with the weight tabulated in an appropriate row of a measurement recording modules. With the fish identified by a color or number coded floater and maintained in a live well, when the number of fish exceeds the predetermined number, it is necessary for the fisherman to cull the catch. By an instant review of the tabulations on the present invention, the fisherman can quickly determine and release the lowest weight fish. This continues with each new fish caught. Thus, at the conclusion of the tournament, the fisherman has retained only the fish of the greatest weight.

Still other features and advantages of the present invention will become readily apparent to those skilled in the art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

In the following description and in the figures, like elements are identified with like reference numerals. The use of "e.g.," "etc.," and "or" indicates non-exclusive alternatives without limitation unless otherwise noted. The use of "including" means "including, but not limited to," unless otherwise noted.

DETAILED DESCRIPTION OF PREFERRED EMBODIMENTS

The present invention is directed to a low cost, portable weight tabulation board that has particular utility in recording and maintaining the weight of fish caught during a competitive fishing tournament, where the object is to catch a maximum number of fish during a prescribed time limit. There typically is no limit on the number of fish that may by caught so a convenient and reliable system must be available for the fisherman to allow him to quickly determine the fish to be retained and the fish to cull; thereby, allowing him to maximize the time spent fishing. Furthermore, the present invention is also directed to minimizing the potential of measurement loss during the fishing tournament by providing a measurement recording device free of the use of markers and other systems.

Figure 1:
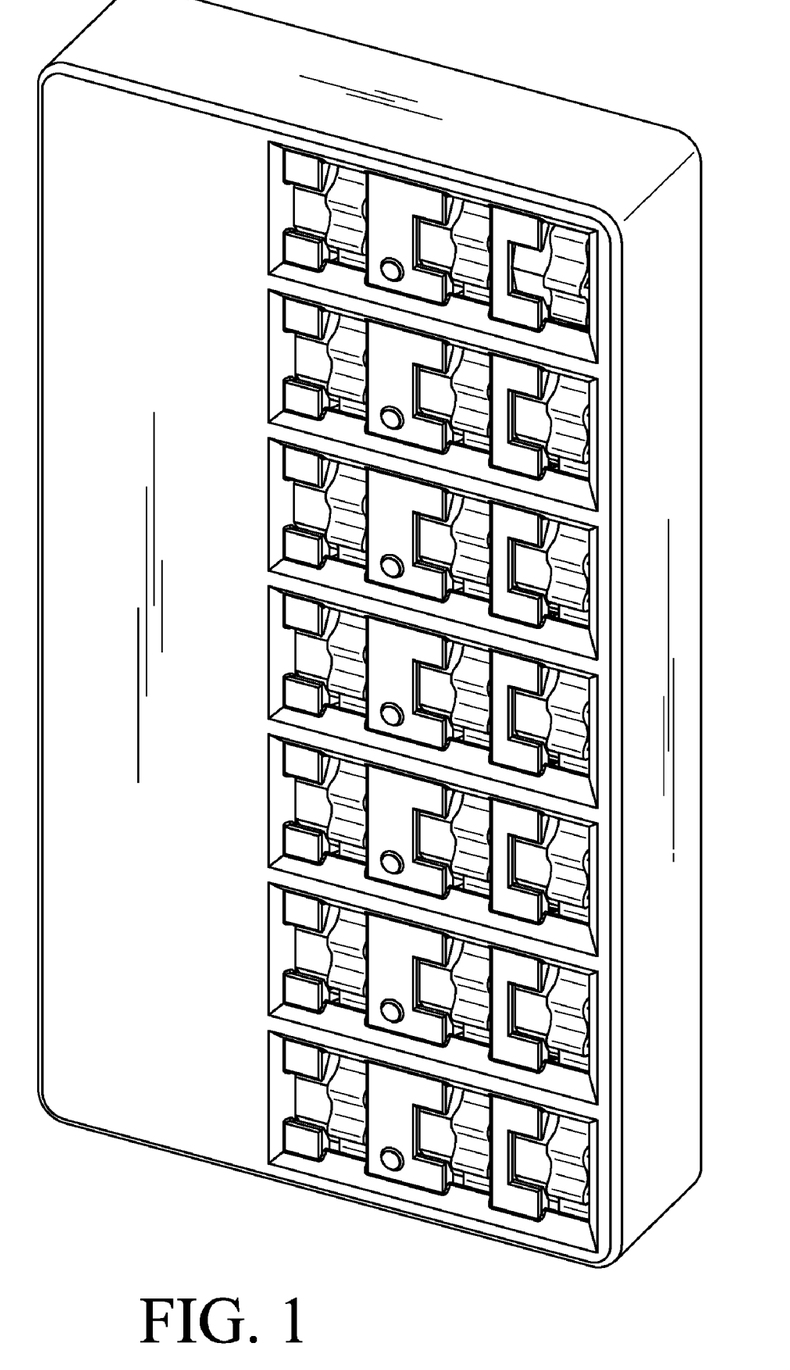
FIG. 1 is a perspective view of a fish measurement culling device body showing our new design.
Figure 2:
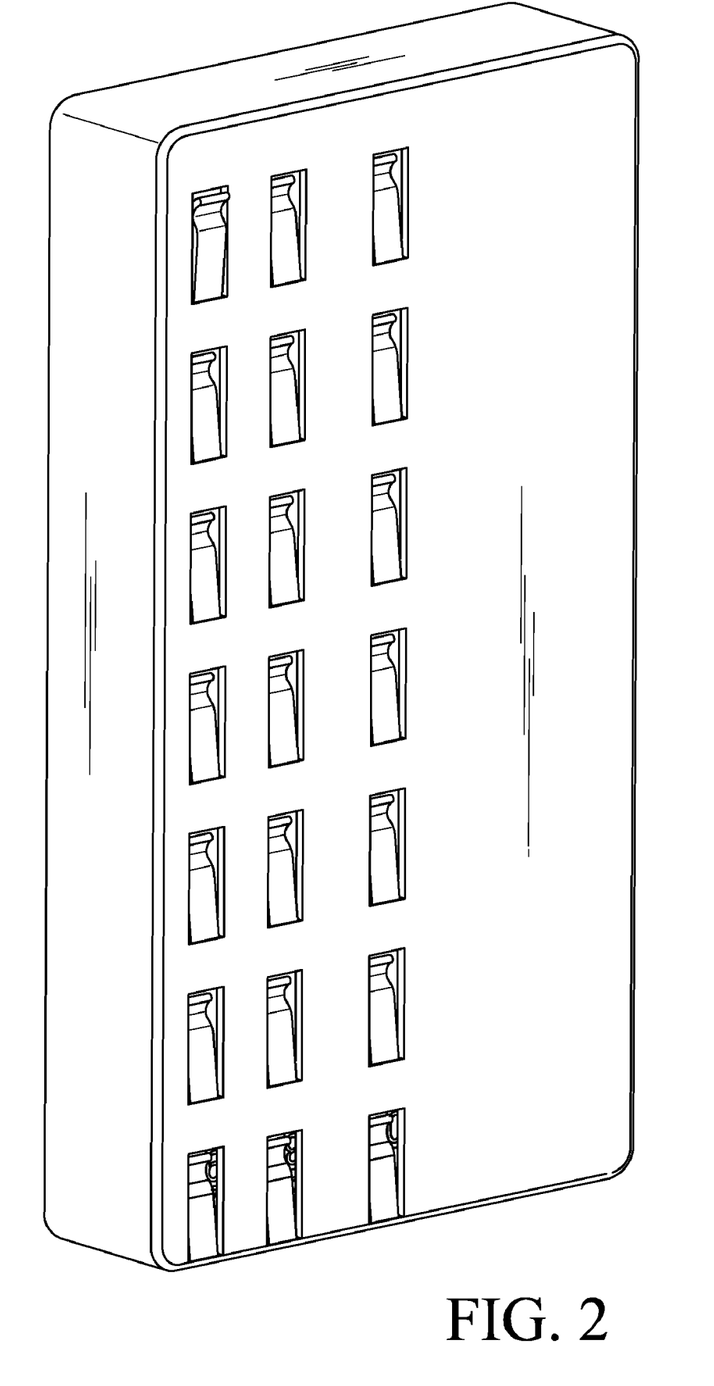
FIG. 2 is a perspective view of the device body showing our new design.
Figure 3:
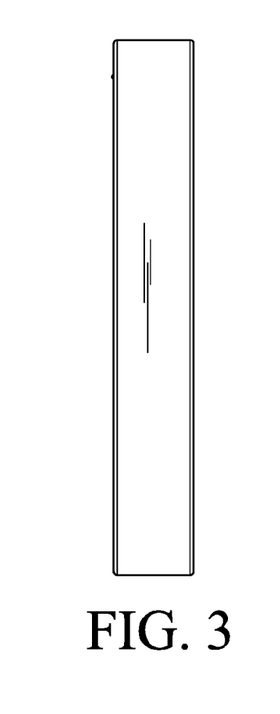
FIG. 3 is a right side elevational view thereof.
Figure 4:
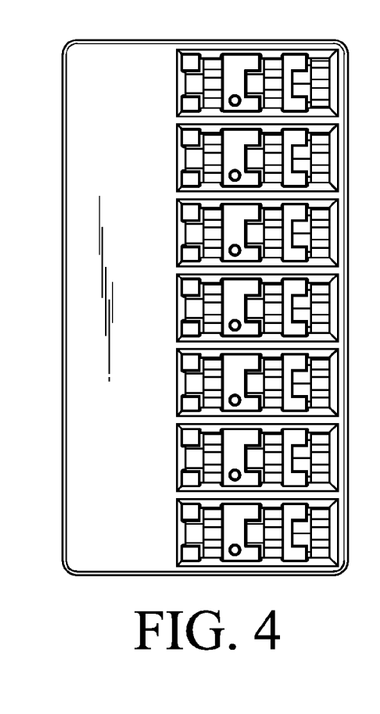
FIG. 4 is a front elevational view thereof.
Figures 5, 6, 8:
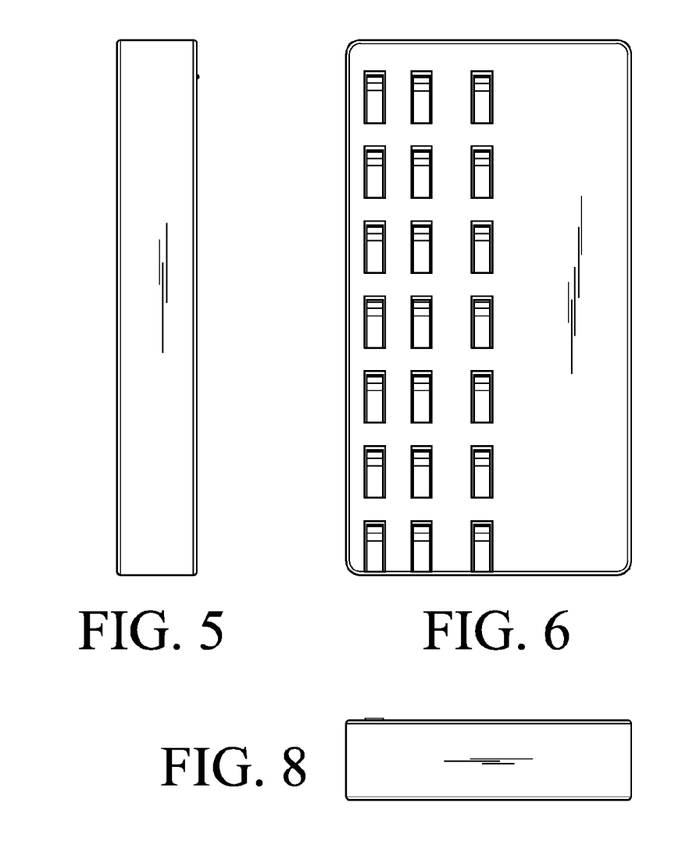
FIG. 5 is a left side elevational view.
FIG. 6 is a rear elevational view thereof.
FIG. 8 is a bottom elevational view thereof.
Figure 7:
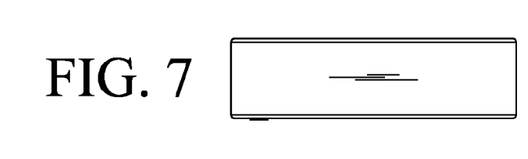
FIG. 7 is a top elevational view thereof.
Figure 9:
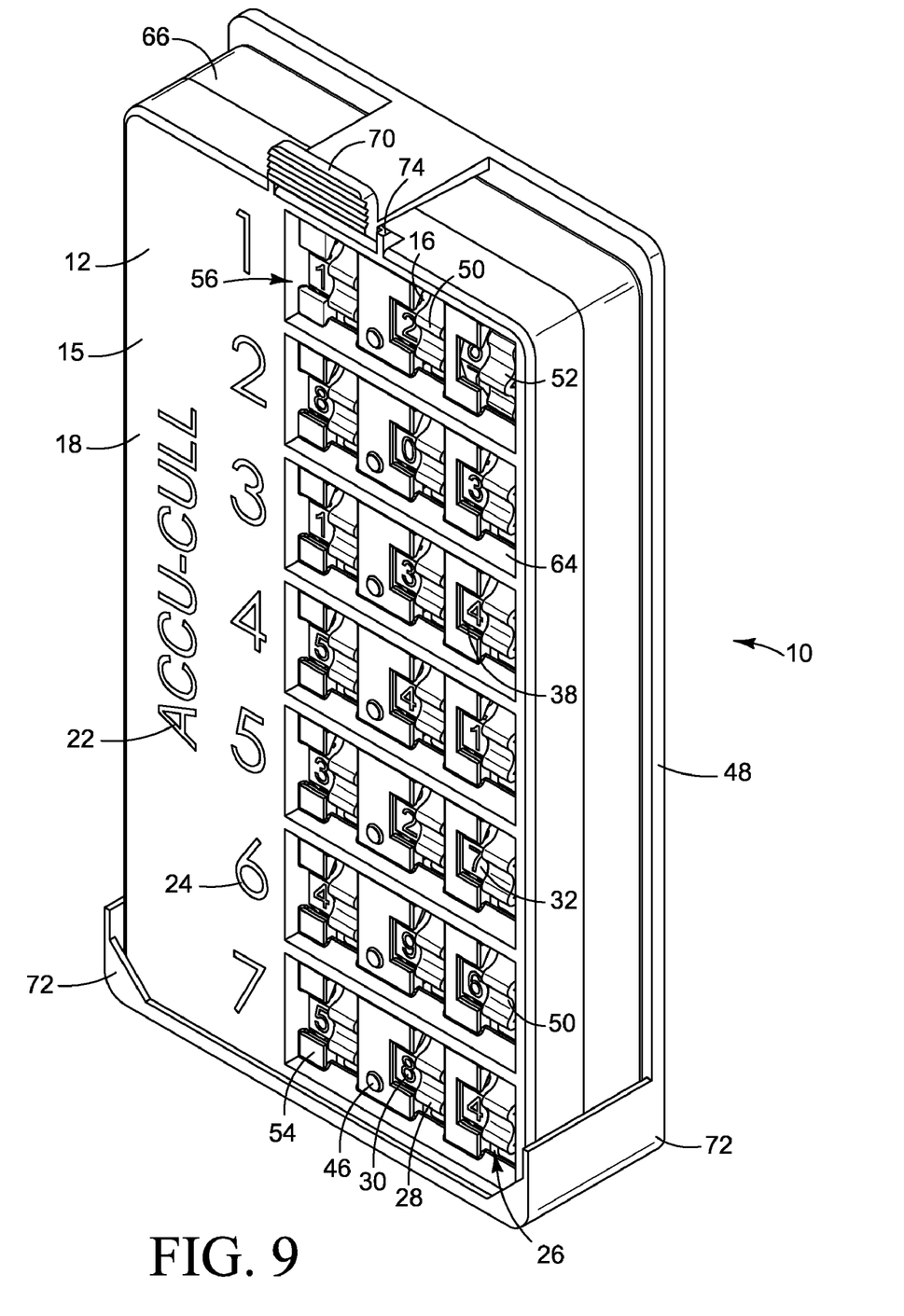
FIG. 9 is a front perspective of the fish measurement culling device.

FIG. 9 illustrates the fish measurement culling device 10, comprising a device body 12, a floatation chamber 15, and a measurement chamber 16. In a preferred embodiment, the fish measurement culling device 10 can float in water. However, it is not necessary that the fish measurement culling device 10 can float in water. Additionally, in another preferred embodiment, the device body 12 is constructed of durable, molded thermoplastic although other materials known can also be used including, but not limited to, a device body made of foam. The device body 12 has a front 18 and a back 20. On the front 18 of the device body 12 is the name 22 of the invention, The Accu-Cull. Additionally, there is a series of numbers, colors, or other indicia 24 corresponding to the number of measurement recording modules 56 within the measurement chamber 16. Although in the preferred embodiment there are both numbers and colors 24 located on the front of the device body 12 to correspond to the appropriate tag placed on fish in the live well, any means of indicia can be used to indicate what fish the recorded measurement corresponds. The means for indicating what the measurement displaying modules reference include, but are not limited to, numbers, colors, symbols, words, colored ratchet and wheel modules, and any other form of reference indicia known to those skilled in the art. Additionally, different embodiments can use one or more reference indicia on the device body 12.

Another embodiment of the present invention features a scale attached to the present invention or embodied within the invention. This addition simplifies the method of weighing, recording, and culling fish and fish measurements as all of the tools needed including a scale, a weight recording device, and a method of changing the weights, are included in one device. This simplifies the fisherman's necessary steps while saving him time and effort.

In addition, the measurement chamber 16 has a series 64 of openings 38 to see the numbers 32 on the measurement recording modules 56. In a preferred embodiment, each of the openings 38 to see the numbers 32 on the ratchet and wheel module 26 has two ears 54 to cover aspects of the number wheel 30 not selected for display.

In the preferred embodiment, the measurement recording modules 56 are made of three ratchet and wheel modules 26. The measurement recording modules 56 can consist of either mechanical or electronic measurement recording modules. Mechanical measurement recording modules can include the ratchet, wheel, and pawl embodiment as in the present invention, a series of tally counters, or any other mechanical counter known. Electronic counters include digital measurement recording modules comprising of a Liquid Crystal Display screen coupled with an electronic circuit for recording and displaying numbers and any other electronic counter known.

In the ratchet and wheel embodiment, the number of ratchet and wheel modules 26 can be either increased or decreased depending on the number of digits in the measurement modules 10 desired to be kept. For example, in a typical bass or trout fishing tournament the fish rarely exceed ten pounds therefore the number of digits necessary in recording the weight of the fish is typically only three. However, in a red fish tournament or similar tournament in which the fish are much larger the angler may need to record four, five, or even more digits in the measurement. Although the three ratchet and wheel modules 26 can be connected, in a preferred embodiment the three ratchet and wheel modules are not connected. The two ratchet and wheel modules on the right of the floatation chamber 15 when viewing it from the front, are connected. However, the furthest left most ratchet and wheel module is not connected to the other two in order to allow for a wider break between openings in order to accommodate the indicator dot 46. The ratchet and wheel modules 26 are made of a ratchet side 28 and a number wheel 30. The number wheel 30 displays numbers 32 through the opening 38 in the measurement chamber 16. Furthermore, in an ideal embodiment, each opening 38 in the measurement chamber 32 is open to see the number 32 of the number wheel 30 which has two ears 54 to cover numbers on the number wheel 30 not selected for display. The front 19 of the measurement chamber 16 has an indicator dot 46 positioned to indicate for easy reference the number 32 desired for display on the number wheel 30.

Additionally, in the preferred embodiment, the device body 12 fits into a carrier 48. In this embodiment, the device body 12 has a flange 74 located at the top 66 of the device body 12. The device body 12 can therefore fit into a cradle 48 which has two corners 72 at the bottom and a clip 70 at the top 66 made to clip over the flange 74 of the device body 12. In this embodiment, the bottom 68 of the device body 12 fits into the casing 48 for added stability and increased functionality. In one embodiment, the cradle 48 is configured to be mounted on a surface of a boat in order to hold the device body 12 in place.

Figure 10:
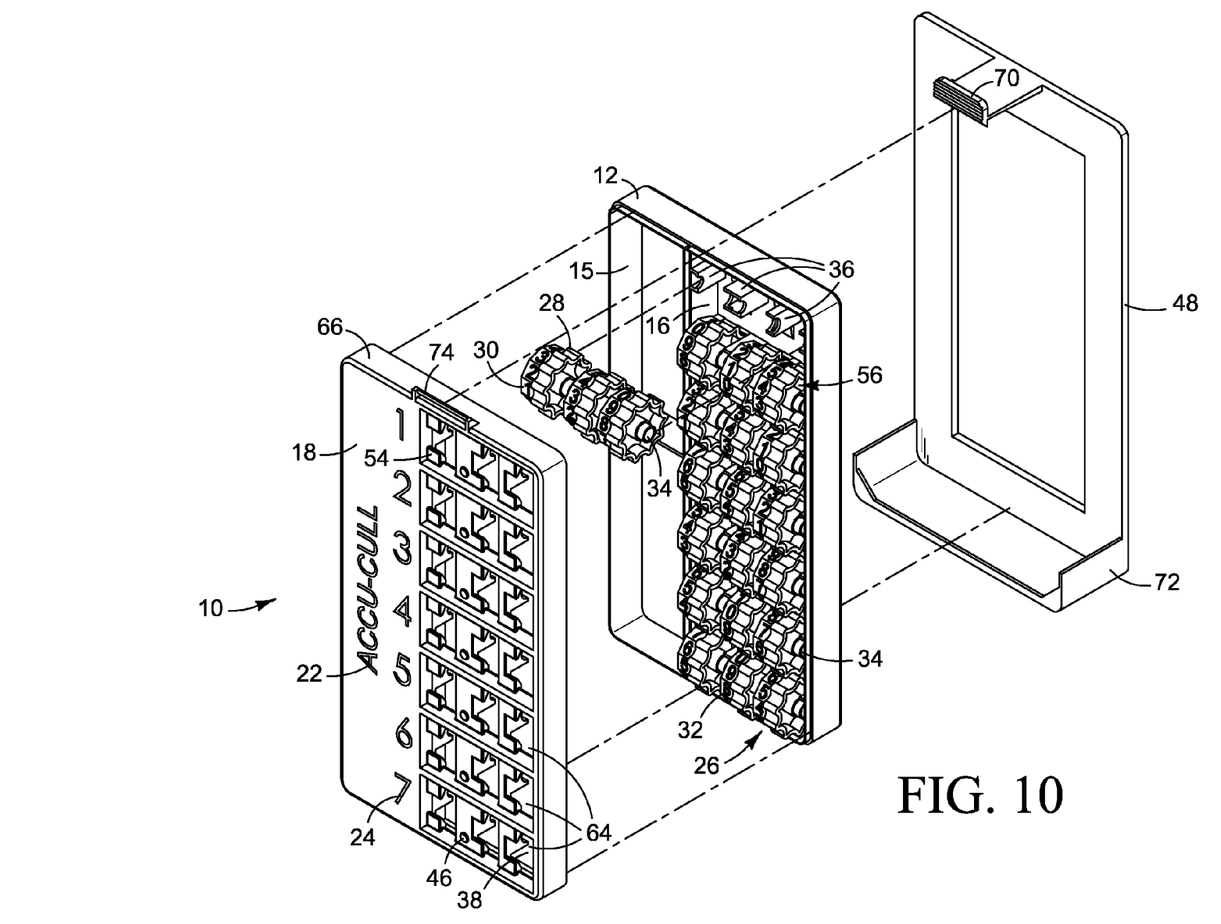
FIG. 10 is the front perspective of the fish measurement culling device exploded.

FIG. 10 illustrates an exploded view of the device body 12 in casing 48. The view illustrates the measurement recording module 56 and the attachment means 36 within the measurement chamber 16. The measurement recording module 56 is ideally made of three ratchet and wheel modules 26 that are held in place by brackets, 36 within the measurement chamber 16. As illustrated in FIG. 10 the measurement chamber 16 houses the measurement recording modules 56 and the floatation chamber 15 can be hollow in the ideal embodiment or filled with some type of buoyant material such as, but not limited to, foam or a floating plastic.

Furthermore, the floatation chamber 15 can be configured to keep the device body 12 floating in water for an extended duration in the event the device body 12 is lost while the fisherman is fishing on a body of water. Although the device body can also be configured not to float in water as well, in one embodiment the floatation chamber 15 is configured to temporarily keep the device body 12 afloat allowing the fisherman to immediately retrieve the device 12 from the body of water he is fishing on or even from a live well if the device body 12 is accidentally dropped into the live well. This is generally achieved by leaving the floatation chamber 15 as a hollow chamber to provide buoyancy to the device body although a buoyant material may be placed in the measurement chamber as well.

Figure 11:
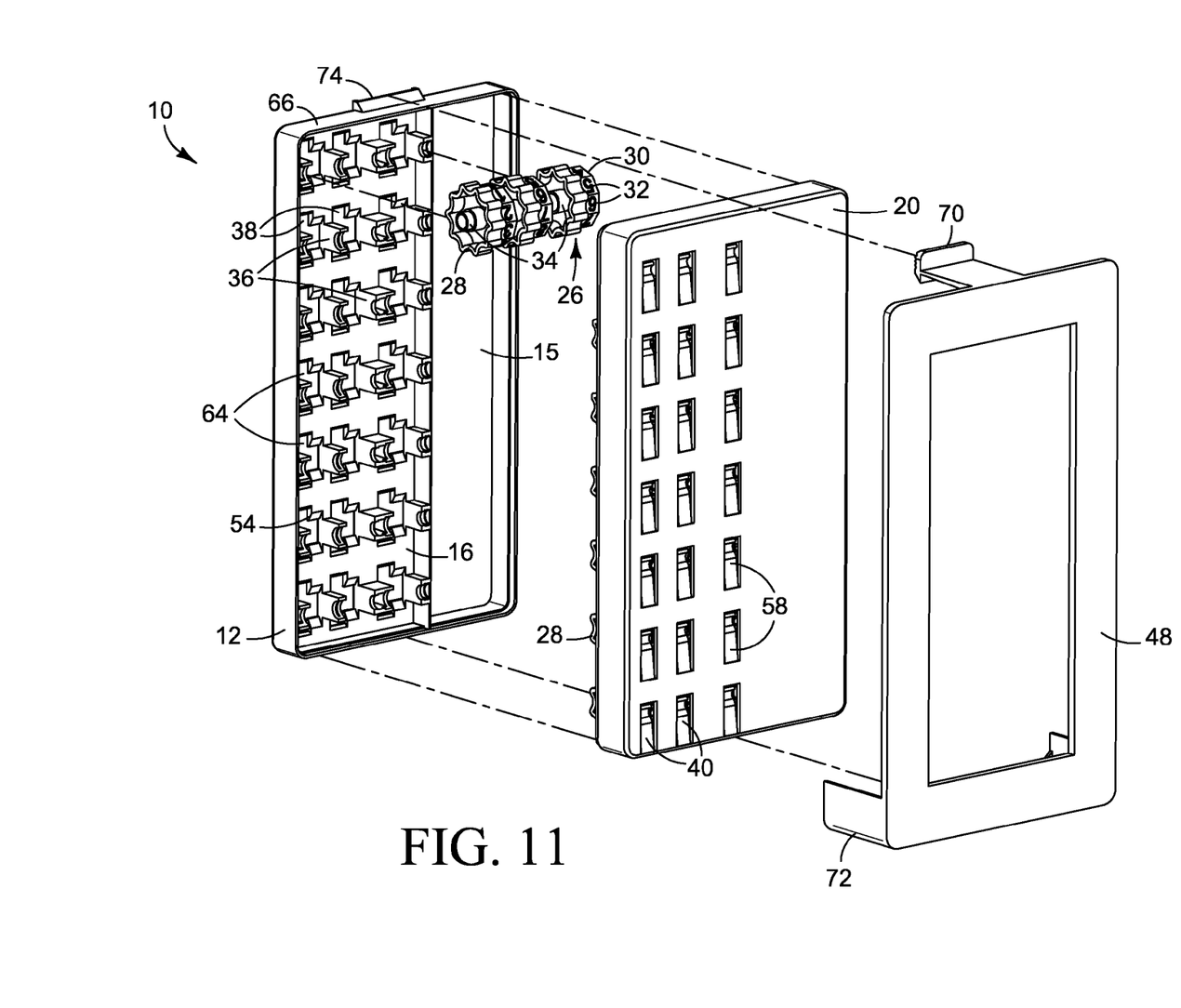
FIG. 11 is the rear perspective of the fish measurement culling device exploded with cradle.

FIG. 11 represents an exploded rear perspective of the fish measurement culling device 10 including the device body 12 and the cradle 48. The view illustrates brackets forming the connection means connecting the ratchet and wheel device to the device body brackets 36 attached to the front 18 of the device body 12. The view also illustrates that the prongs 34 of the measurement recording modules 56 fit into the brackets 36, of the device body 12. The view illustrates that the measurement recording modules 56 are composed of three ratchet and wheel modules 26 attached by prongs 34. The three ratchet and wheel modules 26 are configured to be interlocking in a preferred embodiment of the device body 12 and the measurement chamber 16.

FIG. 11 further illustrates a series of pawls 58, indented into the back 20 of the device body 12. In a preferred embodiment, the pawls 58 are formed as indentations in the back 20 of the device body 12. The pawls 40 can also be attached to the device body 12 using a variety of means including, but not limited to, attaching a separate pawl to the interior of the device body 12 with and adhesive, screw, nut and bolt, or any other attachment mechanism known to those skilled in the art. The series of pawls 58 can be composed of one or more pawls 40 depending on the number of digits desired to be recorded on the fish measurement recording device 56. The pawls 40 of the device body 12 are intended to interlock with the teeth 42 of the ratchet side 28. The pawl 40 rests in the indentation 44 of the ratchet teeth 42 when the desired number 32 is displayed on the wheel piece 30. The pawls 40 are ideally formed as a part of the device body 12, preferably formed when liquid plastic is poured into a mold for the device body with the mold having a molding for a pawl. Additionally, the ratchet and wheel pieces 26 are also ideally made of a durable thermoplastic.

Figure 12:
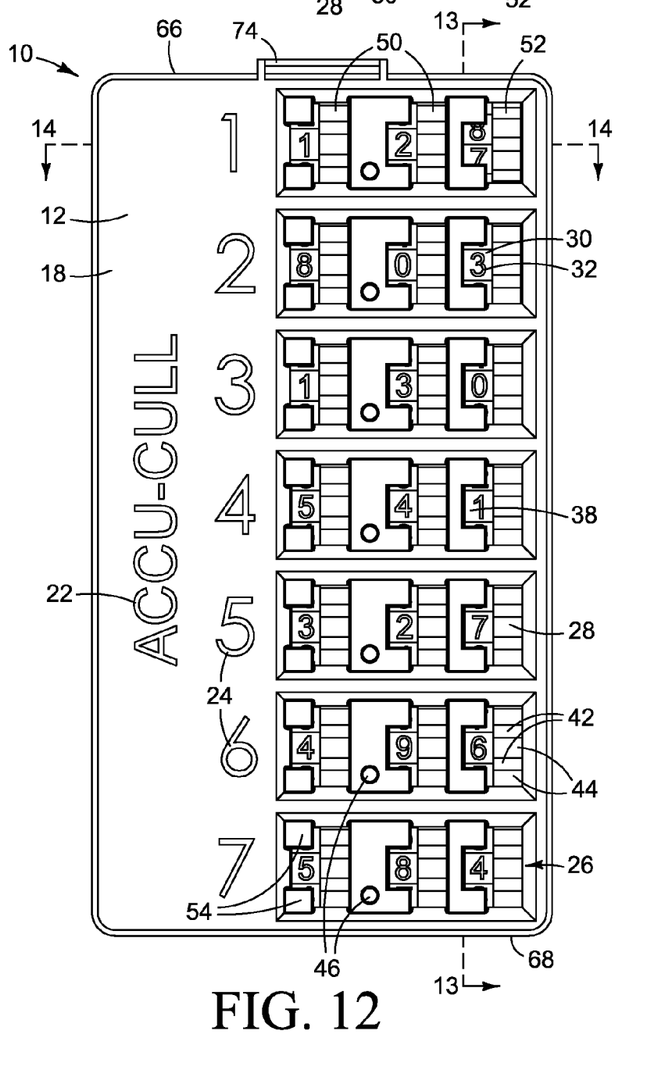
FIG. 12 is the front view of the fish measurement culling device.

FIG. 12 illustrates the ratchet and wheel module 26 both in a selected position 50 in detent, as well as rotating 52 between numbers 32.

Figure 13:
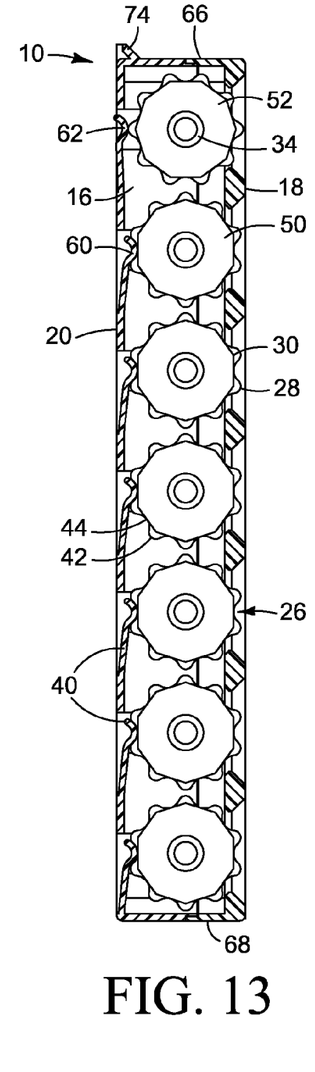
FIG. 13 is the cross sectional view along vertical axis 13 of FIG. 12.
Figure 14:
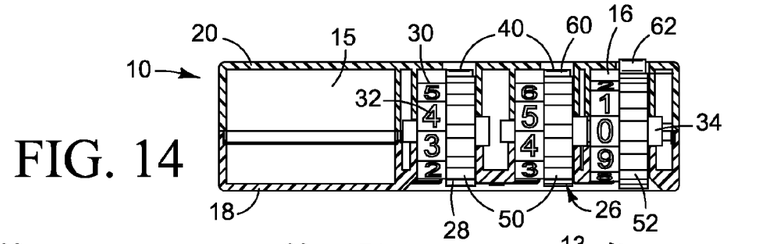
FIG. 14 is the cross sectional view along the horizontal axis 14 of FIG. 12.
Figure 15:
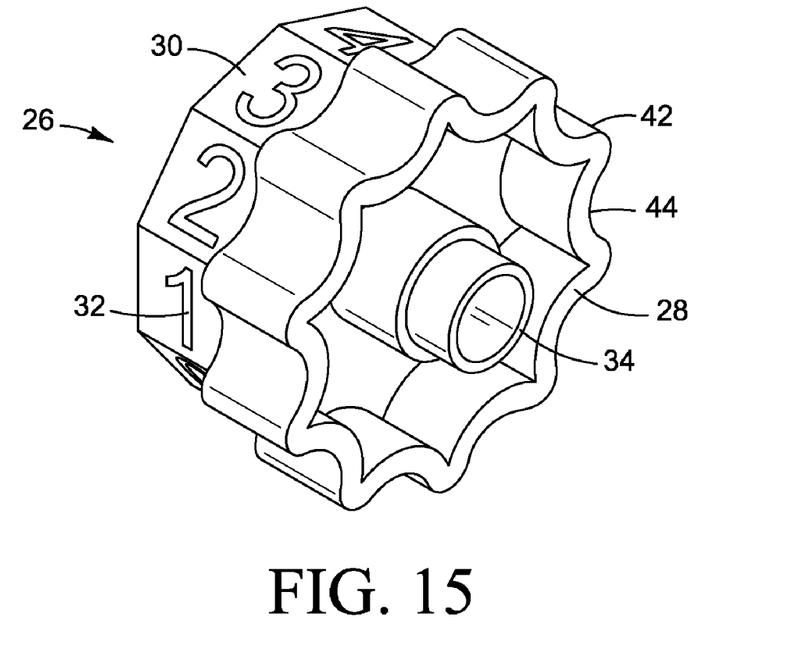
FIG. 15 is the side of the ratchet and wheel module.
Figure 16:
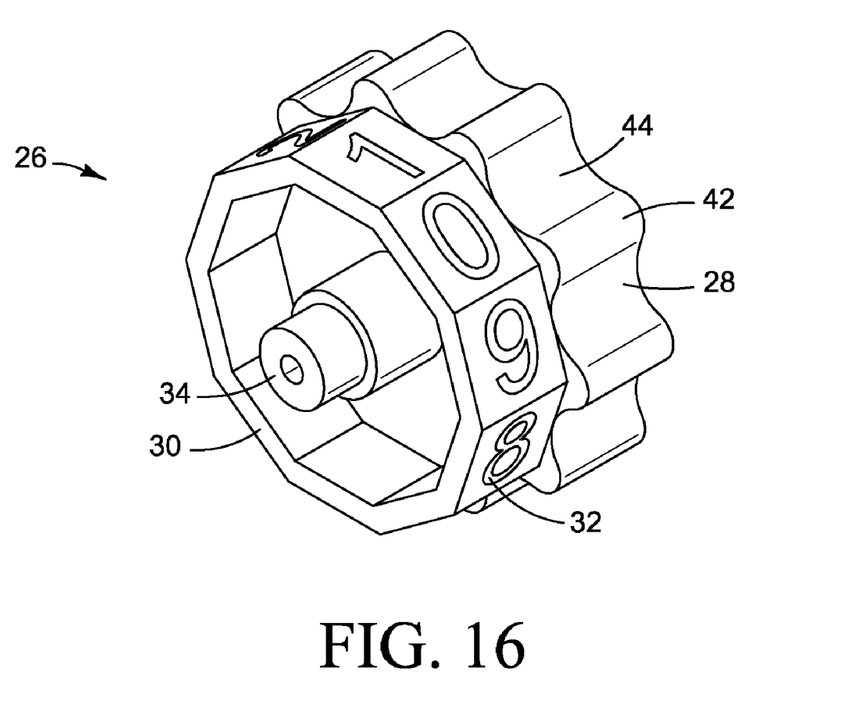
FIG. 16 is the opposite side view of the ratchet and wheel module of figure

FIG. 13 shows a vertical cross section of the measurement chamber 16 illustrating the interaction between the pawl 40 and the teeth 42 of the ratchet piece 28. FIG. 13 also illustrates that in one embodiment when the ratchet and wheel module 26 is in detent 50 the pawl 60 is depressed beneath the surface of the measurement chamber 16. The figure also illustrates that in a preferred embodiment when the ratchet and wheel module 26 is out of detent 52 the pawl is extended 52 beyond the surface of the measurement chamber 16. This illustrates a further embodiment of the invention in that if the device body is placed on its back on a flat surface, the pawls 40 are not able to extend beyond the surface 76 of the measurement chamber 16 thus preventing the ratchet and wheel modules 26 from rotating.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A device for recording and displaying fish measurements, said device comprising:
    a device body with a first side and an opposite second side, said first side and said opposite second side forming a generally rectangular device body;
    a plurality of measurement display modules mounted in said device body, each module configured to display a measurement of a particular fish so that a measurement of one fish can be compared to measurements of other fish;
    an indicia adjacent each module to identify said particular fish;
    wherein, a measurement of a selected fish may be displayed in each measurement display module, multiple modules can display measurements for multiple fish, and said device can thereby be used to identify outliers in fish measurements;
    wherein said device is configured to float in water, and wherein said measurement displaying module in said device for recording and displaying fish measurements further comprises a plurality of counting modules, said counting modules having a wheel and at least one fish measurement indicia on the wheel and a detent mechanism for preventing said wheel from inadvertently moving.

2. The device for recording and displaying fish measurements as in claim 1 wherein:
    said plurality of said counting modules further comprises a plurality of ratchet and wheel modules, said ratchet and wheel modules having a circular ratchet side and a circular wheel side, said wheel side displaying numbers, said ratchet side having teeth, said ratchet side and said wheel side positioned adjacently, said ratchet and wheel module comprising at least one piece, said ratchet and wheel module positioned such that a number selected for display is displayed on said first side of said device body; and
    said detent mechanism further comprises a pawl positioned within said device body such that said pawl prevents said ratchet and wheel module from inadvertently moving without application of sufficient force to rotate said ratchet and wheel module over said pawl.

3. The device for recording and displaying fish measurements as in claim 2 wherein said device for recording and displaying fish measurements is attached to a cradle, said cradle for holding said device for recording and displaying fish measurements in place is configured to be mounted on a surface of a boat.

4. A device for recording and displaying fish measurements, said device for recording and displaying fish measurements comprising:
    a device body with a first side and an opposite second side, said first side and said opposite second side forming a generally rectangular device body;
    said device body having at least two chambers within said device body, at least one of said chambers in said device body comprising a chamber housing a series of measurement display modules;
    a plurality of measurement display modules mounted in one of said chambers in said device body, each module configured to display a measurement of a particular fish so that a measurement of one fish can be compared to measurements of other fish;
    wherein said chamber housing said series of measurement recording modules having a plurality of openings for displaying said measurement recording modules of said series of measurement recording modules;
    an indicia adjacent each measurement display module corresponding to an indicia on a fish tag to identify said particular fish with said measurement display module; and
    wherein, a measurement of a selected fish may be displayed in each measurement display module, multiple modules can display measurements for multiple fish, and said device can thereby be used to identify outliers in fish measurements.

5. The device for recording and displaying fish measurements as in claim 4 wherein said second chamber further comprises a chamber configured to float in water such that said device body floats in water.

6. The device for recording and displaying fish measurements as in claim 4 wherein said device for recording and displaying fish measurements is attached to a cradle, said cradle for holding said device for recording and displaying fish measurements in place is configured to be mounted on a surface of a boat.

7. The device for recording and displaying fish measurements as in claim 4 wherein said measurement displaying module in said device for recording and displaying fish measurements further comprises a plurality of counting modules, said counting modules having a wheel and at least one fish measurement indicia on the wheel and a detent mechanism for preventing said wheel from inadvertently moving.

8. The device for recording and displaying fish measurements as in claim 7 wherein each of said plurality of counting modules further comprises:
    at least two ratchet and wheel modules, said ratchet and wheel modules comprising at least one piece, said ratchet and wheel modules having a ratchet side and a wheel side, said wheel side having a series of numbers, said ratchet side having teeth;
    said device for recording fish measurements mounted within said measurement chamber such that a number from said series of numbers on said number side is displayed through said opening for displaying said number wheel; and
    a pawl positioned on said second side of said device body such that said pawl rests between said teeth of said ratchet side such that when said ratchet and wheel module displays said number for display said ratchet and wheel module is prevented from inadvertently moving.

9. A device for recording and displaying fish measurements, said device for recording and displaying fish measurements comprising:
- a device body having a first side and a second opposite side forming a generally rectangular body;
- said device body being divided into two chambers, a first chamber and a second chamber, said second chamber housing a series of measurement recording modules;
- wherein said first chamber is configured for floatation in water;
- a series of indicia on said first side of said device body, each indicia in said series of indicia corresponds to and labels each individual measurement recording module in said series of measurement recording modules;
- a series of rows of openings on said first side of said device body, each of said rows of openings comprises a plurality of openings, each of said rows corresponding to an indicia in series of indicia of said first side of said device body, each of said indicia corresponding to an indicia on a tag for tagging a fish;
- wherein the number of series of measurement recording modules housed within said second chamber corresponds to said number of series of openings in said second chamber, each of said measurement recording modules comprising a plurality of interchangeable ratchet and wheel modules, each of said measurement recording modules positioned in said second chamber such that each of said interchangeable ratchet and wheel modules can be viewed through each of said openings in said chamber, each of said ratchet and wheel modules having a ratchet side and a wheel side, said ratchet side being adjacent to said wheel side, each of said ratchet and wheel modules comprising at least one piece, each of said ratchet sides shaped in a generally circular form, each ratchet side and each wheel side having a third side and a fourth side formed as the area of the circular form of each ratchet side and each wheel side of said ratchet and wheel module;
- a plurality of prongs, each of said prongs extending from each of said sides formed as the area of the circular form of each ratchet side and each wheel side of each ratchet and wheel module;
- a series of brackets in said measurement chamber that hold said ratchet and wheel modules in place by bracketing said prongs on said ratchet and wheel modules while allowing each of said ratchet and wheel modules to rotate;
- wherein each of said measurement recording modules is comprised of one or more of said ratchet and wheel modules, said number of ratchet and wheel modules corresponding to said number of openings in said rows of openings in said first side of said device body;
- wherein said second side of said device body has a plurality of series of pawls, each series of pawls in said plurality of series of pawls having a plurality of pawls, each of said pawls located on said second chamber, said number of said series of said pawls corresponds to said number of said openings in said second chamber; and
- wherein said ratchet and wheel module is housed in said second chamber such that said pawl fits between said teeth of said ratchet side of said ratchet and wheel module, said pawl preventing each of said ratchet and wheel modules from rotating unless a sufficient force is applied to each of said ratchet and wheel modules to push said teeth of each of said ratchet and wheel modules over each of said pawls.

10. The device for recording and displaying fish measurements as in claim 9 wherein said device for recording and displaying fish measurements is attached to a cradle, said cradle for holding said device for recording and displaying fish measurements in place is configured to be mounted on a surface of a boat.

* * * * *